(12) United States Patent
Tsyganov

(10) Patent No.: US 8,425,358 B2
(45) Date of Patent: Apr. 23, 2013

(54) HYBRID DRIVE FOR A TRANSPORTATION MEANS

(75) Inventor: Oleg Anatolievich Tsyganov, Tomsk (RU)

(73) Assignee: Limited liability company "Altera", Tomsk (RU)

( * ) Notice: Subject to any disclaimer, the term of this patent is extended or adjusted under 35 U.S.C. 154(b) by 227 days.

(21) Appl. No.: 12/735,903

(22) PCT Filed: Apr. 30, 2009

(86) PCT No.: PCT/RU2009/000213
§ 371 (c)(1),
(2), (4) Date: Aug. 25, 2010

(87) PCT Pub. No.: WO2009/113915
PCT Pub. Date: Sep. 17, 2009

(65) Prior Publication Data
US 2010/0331130 A1    Dec. 30, 2010

(51) Int. Cl.
*F16H 3/72* (2006.01)
*F16H 37/06* (2006.01)

(52) U.S. Cl.
USPC ............ 475/5; 475/323; 475/149; 180/65.21; 180/65.31

(58) Field of Classification Search ................. 475/5
See application file for complete search history.

(56) References Cited

U.S. PATENT DOCUMENTS

| | | | |
|---|---|---|---|
| 6,251,037 B1 * | 6/2001 | Baumgaertner et al. | 475/2 |
| 6,520,879 B2 * | 2/2003 | Kawabata et al. | 475/5 |
| 6,849,017 B2 * | 2/2005 | Nett | 475/5 |
| 7,204,776 B2 * | 4/2007 | Minagawa et al. | 475/5 |
| 7,207,915 B2 * | 4/2007 | Oshidari et al. | 475/5 |
| 2004/0084234 A1 * | 5/2004 | Yatabe et al. | 180/65.2 |
| 2007/0187159 A1 * | 8/2007 | Lee et al. | 180/65.2 |

* cited by examiner

*Primary Examiner* — David D Le
*Assistant Examiner* — Colby M Hansen
(74) *Attorney, Agent, or Firm* — Aleksandr Smushkovich

(57) ABSTRACT

A hybrid drive is proposed for traction wheels of a vehicle, which drive comprises a mechanical power source with a shaft, a planetary mechanism having a sun and a ring gear wheels, and two reversible electrical machines connected to an electrical power source via a control system. A carrier of the planetary mechanism is coupled to the shaft. With the view to increasing the traction wheels' torque, one of the electrical machines is designed as a two-dimensional machine with two rotatable members, one of which members is coupled to the sun gear wheel, the second member is coupled to the ring gear wheel. For increasing the performance characteristics, the drive is provided with two controllable clutches, which make it possible to interconnect the rotatable members and to couple the carrier to an immovable portion of the drive or vehicle. Operation of the drive in various motion modes is also described.

6 Claims, 1 Drawing Sheet

HYBRID DRIVE FOR A TRANSPORTATION MEANS

CROSS-REFERENCE TO RELATED APPLICATIONS

This application is a U.S. national phase application of a PCT application PCT/RU2009/000213 filed on 30 Apr. 2009, published as WO2009/113915, whose disclosure is incorporated herein in its entirety by reference, which PCT application claims priority of a Russian patent application RU2008/109427 filed on 11 Mar. 2008.

FIELD OF THE INVENTION

The invention relates to the area of transportation, and can be used for construction of hybrid vehicle drives.

BACKGROUND OF THE INVENTION

There is known a hybrid drive (DE No 3338548), for a vehicle, having an internal combustion engine (ICE) and an electrical machine installed in a case; the electrical machine has a stator and a rotor, both capable of rotating. An output shaft of the ICE is coupled to one of rotating elements of the electrical machine, and its other rotating element is coupled by means of a mechanic transmission to the vehicle's driving wheels. In this scheme, the electrical machine converts a part of mechanic energy of the ICE into electrical energy, and transmits the other part of mechanic energy of the ICE to a mechanic gear box. Such drive has a disadvantage of having oversized dimensions of the electrical machine, because the electrical machine must transmit the total ICE torque to the driving wheels.

There is known a hybrid power unit (RU No 2264307) for a vehicle. The power unit is mounted in a case, and includes a drive that comprises an electric power storage-source, connected through a control system to several reversible electrical machines; at least one of the machines is installed in the case, and has a stator and a rotor, both capable of rotation. The rotor of this electrical machine can be coupled to a mechanical power storage-source, and the stator can be coupled to one or several driving wheels on which a braking system is installed. Such drive has the same disadvantage: since the electrical machine with two rotating elements must transmit the total ICE torque to the driving wheels, its dimensions are oversized.

There is also known a drive for a hybrid car (U.S. Pat. No. 5,865,263), herein considered as the nearest related art device (herein also called a 'prototype'), which comprises: an ICE usable as a mechanic energy source; two electrical machines, wherein the first electrical machine is a reversible electrical machine; a storage battery used as an electrical power storage-source; a planetary mechanism (planetary gear); and a central control system. The ICE has an output shaft coupled to a planet carrier of the planetary mechanism. The 'sun' gear wheel of the planetary mechanism is coupled to the shaft of the reversible electrical machine, whereas the ring gear wheel of the planetary mechanism, through a number of gear wheels, is coupled to the shaft of the second electrical machine and to a differential of the driving wheels.

The aforesaid drive has a first disadvantage of having an insufficient torque passed to the driving wheels of the vehicle, which is determined only by the ICE torque, the transmission ratio of the planetary mechanism, and a value of torque of the electrical machine coupled to the ring gear wheel.

A second significant disadvantage of the prototype is the low efficiency, determined by energy losses in the electrical machine, coupled only to one of the central gear wheels of the planetary mechanism, which prevents the transmission of torque from the ICE to the vehicle wheels, if this electrical machine is switched off.

A third disadvantage of the prototype is an insufficient drive torque when the ICE it is switched off. In such a case, the vehicle is moved using the first electrical machine, coupled to the ring gear wheel of the planetary mechanism; whereas the second electrical machine, coupled to the sun gear wheel, is switched off, and its shaft freely rotates.

BRIEF SUMMARY OF THE INVENTION

The object of this invention is to provide an increase of the torque transmitted from the ICE to the vehicle's driving wheels, and also to raise the drive efficiency.

This object is achieved by providing the below-described inventive hybrid drive for rotation of driving (traction) wheels of a vehicle. The inventive drive comprises: a mechanical power storage-source in the form of ICE including an ICE shaft; an electrical power storage-source (preferably in the form of an electric battery); a control system; two reversible electric machines connected through the control system to the electrical power storage-source, and a planetary mechanism including a sun gear wheel, a ring gear wheel, and a carrier. Unlike in the prototype, in the inventive drive, one of the electrical machines is a so-called 'two-dimensional machine', or a 'double rotation machine', having two rotatable members: a 'rotor' and a 'revolvable stator'. The second electrical machine is herein called a 'regular' electrical machine. The carrier is coupled to the ICE shaft, the sun gear wheel is coupled to a first rotatable member of the two-dimensional electrical machine, and the ring gear wheel is coupled through a controllable clutch to the differential of driving wheels of the vehicle. The drive is additionally supplied with another controllable clutch for coupling the rotatable members of the two-dimensional machine to each other, and also with one more controllable clutch for coupling the carrier to an immovable portion of the drive or the vehicle.

BRIEF DESCRIPTION OF DRAWINGS

Identical reference numerals indicated on FIGS. 1 and 2 are designated to identical elements of the inventive hybrid drive described herein below. A first time introduced reference numeral in the description is enclosed into parentheses.

DETAIL DESCRIPTION OF PREFERRED EMBODIMENTS OF THE INVENTION

Figure 1:
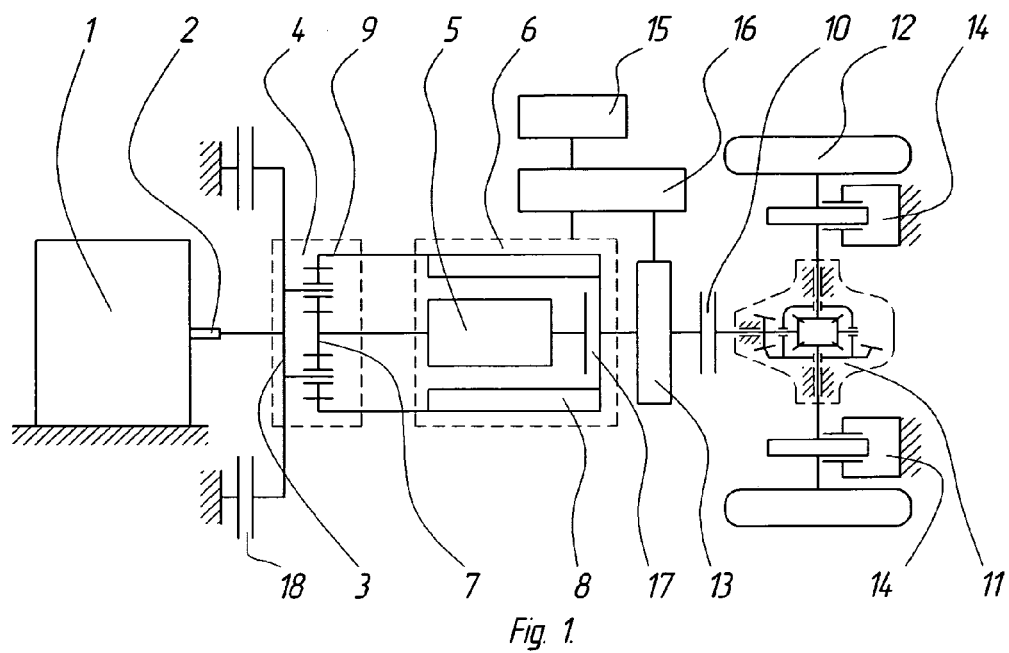
FIG. 1 is a schematic view of the hybrid drive according to a first preferred embodiment of the present invention.

While the invention may be susceptible to embodiment in different forms, there is shown in the drawing, and will be described in detail herein, specific embodiments of the present invention, with the understanding that the present disclosure is to be considered an exemplification of the principles of the invention, and is not intended to limit the invention to that as illustrated and described herein.

Figure 2:
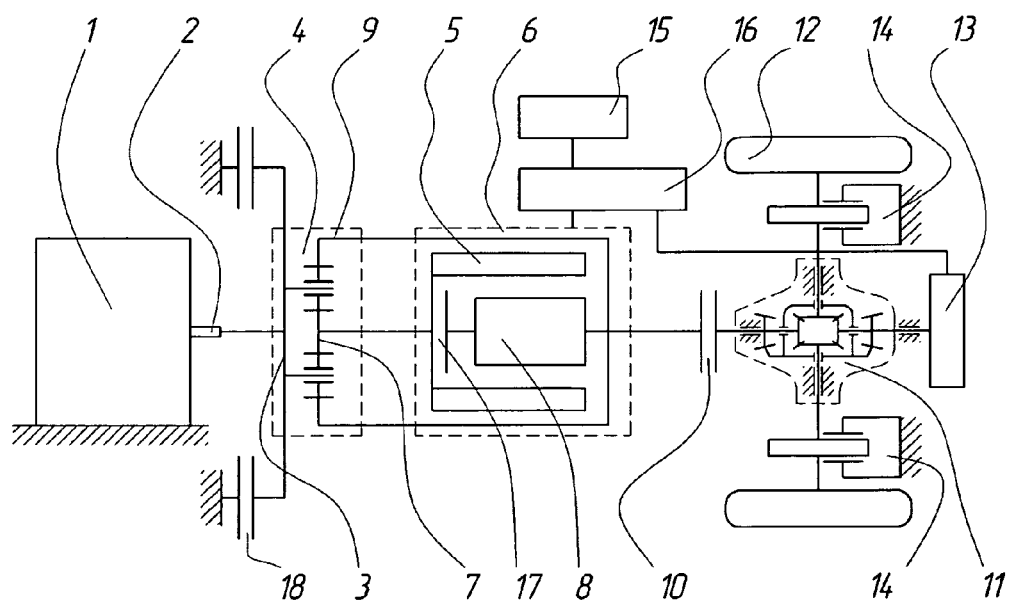
FIG. 2 is a schematic view of the hybrid drive according to a second preferred embodiment of the present invention.

Preferred embodiments of the inventive hybrid drive for a vehicle are illustrated on FIGS. 1 and 2. The drive comprises: a mechanical energy source (1), preferably represented by an internal combustion engine stationed on the vehicle, the mechanical energy source 1 has a shaft (2); a planetary mechanism (4) including a sun gear wheel (7), a ring gear wheel (9), and a carrier (3) that is coupled to the shaft 2, and the carrier 3 is also coupled to an immovable portion of the drive or vehicle through a first controllable clutch (18); a regular electrical machine (13) stationed on the vehicle; and a two-dimensional electrical machine (6) stationed on the vehicle, wherein the two-dimensional electrical machine 6 includes an internal rotatable member (5) and an external rotatable member (8), and wherein the internal rotatable member 5 and the external rotatable member 8 are capable of controllable coupling (interconnection) through a second clutch (17).

As shown in the embodiment illustrated on FIG. 1, the regular electrical machine 13 has a shaft. The internal rotatable member 5 is coupled with the sun gear wheel 7, while the external rotatable member 8 is coupled to a differential (11) of driving (traction) wheels (12) of the vehicle by means of the shaft of regular electrical machine 13 and through a third controllable clutch (10).

In the embodiment shown on FIG. 2, the internal rotatable member 5 is coupled to the differential 11 by means of a third controllable clutch 10, the external rotatable member 8 is coupled to the sun gear wheel 7, whereas the regular electrical machine 13 is directly coupled to the differential 11.

The driving wheels 12 are capable of braking by means of a conventional vehicle braking system (14). The electrical machines 6 and 13 receive electric power from an electric energy storage device (15) (e.g. an electric battery or another electric energy storage device, such as an electrical capacitor, a plurality of electrical capacitors predeterminedly connected therebetween, or any combination thereof) and return electric power inversely under control of a control system (16). The control system 16 also controls the aforementioned clutches of the drive.

As mentioned above, the rotatable members 5 and 8 of the electric machine 6 have a capability of controllable joining each other by means of the second controllable clutch 17, and the carrier 3 of the planetary mechanism 4 has a capability of coupling with the body of vehicle or with an immovable portion of the drive by means of the first controllable clutch 18.

The two-dimensional electrical machine 6 can be designed in any conventional form (e.g. a constant or an alternating current electrical machine, asynchronous electrical machine, synchronous electrical machine, collector electrical machine, inductor electrical machine, or another known type of electrical machine). The electric current can be supplied to and withdrawn from its armature and inductor windings by means of brushes and contact rings (collectors), or by a brushless method, in which case the armature windings are fixed on the body of the electrical machine. The rotatable members 5 and 8 of the two-dimensional electrical machine can have a cylindrical or a disk shape.

The planetary mechanism 4 can be designed in any conventional form, such as: featuring cylindrical gear wheels (as illustrated on FIGS. 1 and 2), or featuring conical gear wheels (not illustrated). The mechanical energy source 1 can be represented not only by an internal combustion engine, but also by other conventional mechanical energy devices (for example, a turbine, or a fly-wheel); the electrical energy storage device 15 can be represented by a conventional electric battery, an electrical capacitor (or a plurality of such capacitors predeterminedly connected therebetween), or any combination thereof.

OPERATION OF THE INVENTION

The inventive drive operates as follows. At start-up of the internal combustion engine 1, the electric machine 6 receives electric power from the storage battery 15, which is switched by the control system 16 in an electric motor mode. The driving wheels 12, through the differential gear 11 and the clutch 10 coupled to the rotatable member 8, and the ring gear wheel 9 are halted at this time by the vehicle's braking system 14. The rotatable member 5, through the sun gear wheel 7 and the carrier 3, rotates the shaft 2 of the internal-combustion engine 1 and starts it up.

Thereafter, the braking system 14 is shut off, and the internal combustion engine 1, through the carrier 3, rotates the ring gear wheel 9, and the engine 1, through the sun gear wheel 7, rotates the internal rotatable member 5 of the electric machine 6, switched by the control system 16 into a generator mode. The member 5 rotates in the same direction, as the external rotatable member 8 does, but with a higher rotational speed. Electric power, generated by the electrical machine 6, is transmitted to the electrical machine 13, while an excess of electric power is accrued in the storage battery 15, or a shortage of electric power is covered by the battery 15. Thus, a torque, developed between the rotatable members 5 and 8 in the machine 6, is added to a torque received from the machine 13 by the driving wheels 12 via the differential 11, and to a torque, received from the internal combustion engine 1 via the ring gear wheel 9 and the carrier 3.

After the vehicle has been accelerated to a predetermined speed, the rotatable members 5 and 8 are coupled by means of the controllable clutch 17, then the electric machines 6 is not supplied with electric power. Thus all mechanic energy of the internal-combustion engine 1 is transmitted to the driving wheels 12 completely (except for inevitable losses in the bearings), and the vehicle's motion speed is determined by a rotary speed of the shaft 2 of the internal combustion engine 1.

For considerable increasing the vehicle's speed, the controllable clutch 17 is disconnected, and the electric machine 6 is switched into an electric motor mode by means of the control system 16; while the rotatable members 5 and 8 rotate in opposite directions.

For acceleration of the vehicle and for its motion without the ignition of internal combustion engine 1 (for example, at motion in "green zones") the electric machine 13 is switched by the control system 16 into the electric motor mode and rotates the vehicle's driving wheels 12.

For increasing the torque of driving wheels 12, the carrier 3 is coupled to the vehicle's body by the clutch 18, then the electric machine 6 is also switched by the control system 16 into the electric motor mode, and the rotatable members 5 and 8 rotate in opposite directions. Thus the torque of electrical machine 6 through the clutch 10 and the differential 11 is transmitted to the vehicle's driving wheels 12 and is added to the torque of electric machines 13.

At the vehicle's downhill motion, the ring gear 9 is disconnect from the driving wheels 12 by means of the clutch 10, then the electrical machine 6 and the internal-combustion engine 1 are switched off that excludes energy losses therein and increases the distance to be passed by the vehicle.

When the vehicle is braking, the electric machines 6 and 13 are switched by the control system 16 into the generator mode, thereby transforming the vehicle's mechanic motion energy into electrical energy, which is accumulated in the storage battery 15.

The invention claimed is:

1. A hybrid drive for traction wheels of a vehicle, the traction wheels are associated with a differential; said hybrid drive comprises:

a mechanical energy source stationed on the vehicle, the mechanical energy source having a shaft;

a planetary mechanism stationed on the vehicle, said planetary mechanism including:
a sun gear wheel,
a ring gear wheel coupled through a third controllable clutch to the differential, and
a carrier coupled with said shaft of the mechanical energy source and coupled with an immovable portion of the drive or of the vehicle through a first controllable clutch;
a reversible electrical machine stationed on the vehicle, said reversible electrical machine having a shaft; and
a reversible two-dimensional electrical machine stationed on the vehicle, said reversible two-dimensional electrical machine including:
an internal rotatable member, and
an external rotatable member; wherein
the internal rotatable member and the external rotatable member are controllably coupled through a second controllable clutch;
the internal rotatable member is coupled with the sun gear wheel; and
the external rotatable member is coupled to the differential by means of said shaft of the reversible electrical machine and said third controllable clutch.

2. The hybrid drive according to claim 1, further comprising:
an electric energy storage device associated with a control system;
wherein said reversible electrical machine and said reversible two-dimensional electrical machine are controllably associated with said electric energy storage device and said control system.

3. The hybrid drive according to claim 2, wherein:
said mechanical energy source is selected from the group consisting of: an internal combustion engine, a turbine, and a fly-wheel;
said reversible two-dimensional electrical machine is selected from the group consisting of: a constant current electrical machine, an alternating current electrical machine, an asynchronous electrical machine, a synchronous electrical machine, a collector electrical machine, and an inductor electrical machine; and
said electric energy storage device is selected from the group consisting of: an electric battery, an electric capacitor, a plurality of electric capacitors predeterminedly connected therebetween, and any combination thereof.

4. A hybrid drive for traction wheels of a vehicle, the traction wheels are associated with a differential; said hybrid drive comprises:
a mechanical energy source stationed on the vehicle, the mechanical energy source having a shaft;
a planetary mechanism stationed on the vehicle, said planetary mechanism including:
a sun gear wheel,
a ring gear wheel coupled through a third controllable clutch to the differential, and
a carrier coupled with said shaft and coupled with an immovable portion of the drive or of the vehicle through a first controllable clutch;
a reversible electrical machine stationed on the vehicle, said reversible electrical machine is directly coupled to the differential; and
a reversible two-dimensional electrical machine stationed on the vehicle, said reversible two-dimensional electrical machine including:
an internal rotatable member, and
an external rotatable member; wherein
the internal rotatable member and the external rotatable member are controllably coupled through a second controllable clutch;
the internal rotatable member is coupled with the differential by means of said third controllable clutch; and
the external rotatable member is coupled to the sun gear wheel.

5. The hybrid drive according to claim 4, further comprising:
an electric energy storage device associated with a control system;
wherein said reversible electrical machine and said reversible two-dimensional electrical machine are controllably associated with said electric energy storage device and said control system.

6. The hybrid drive according to claim 5, wherein:
said mechanical energy source is selected from the group consisting of: an internal combustion engine, a turbine, and a fly-wheel;
said reversible two-dimensional electrical machine is selected from the group consisting of: a constant current electrical machine, an alternating current electrical machine, an asynchronous electrical machine, a synchronous electrical machine, a collector electrical machine, and an inductor electrical machine; and
said electric energy storage device is selected from the group consisting of: an electric battery, an electric capacitor, a plurality of electric capacitors predeterminedly connected therebetween, and any combination thereof.

* * * * *